H. T. BARNES.
MOWING MACHINE.
APPLICATION FILED FEB. 16, 1911.
1,005,125.
Patented Oct. 10, 1911.
3 SHEETS—SHEET 2.
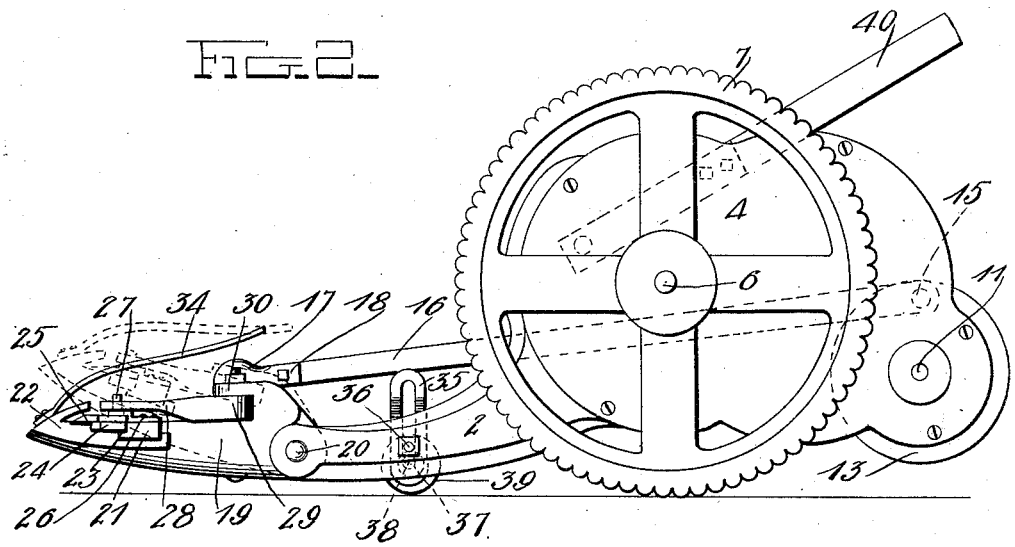
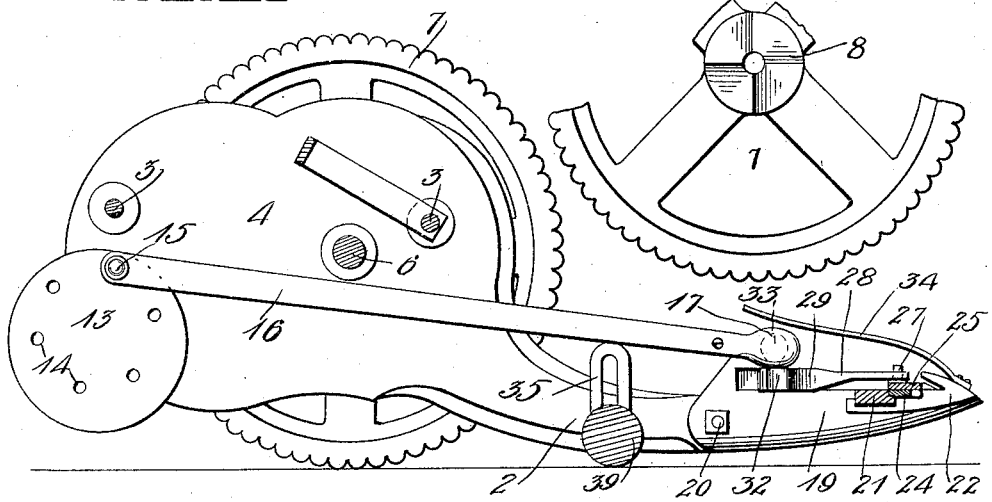
Witnesses
I. N. Pierce.
O. B. Hopkins.
Inventor
H. T. Barnes
by H. B. Willson & Co.
Attorneys H. T. BARNES.
MOWING MACHINE.
APPLICATION FILED FEB. 16, 1911.
1,005,125.
Patented Oct. 10, 1911.
3 SHEETS—SHEET 3.
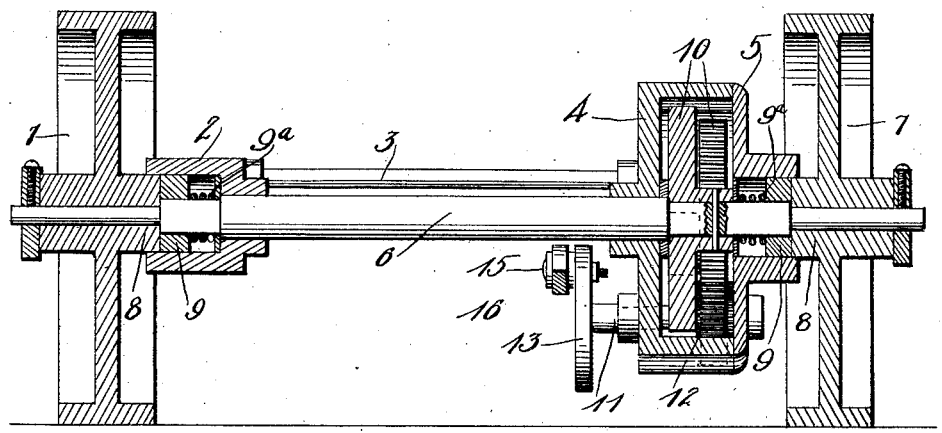
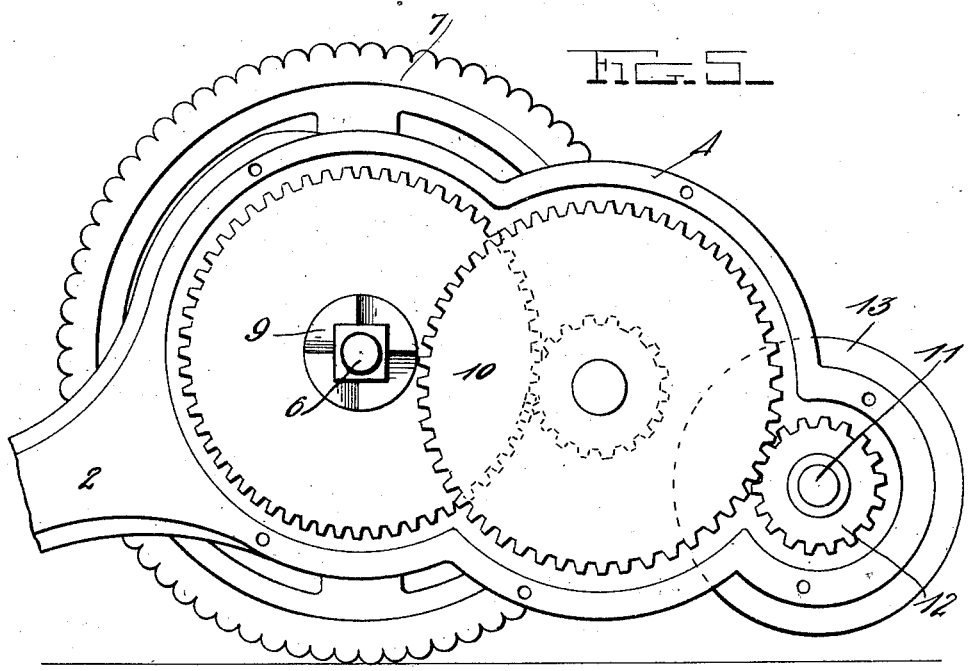
Witnesses
J. R. Pierce
H. 2. Hopkins
Inventor
H. T. Barnes.
by H. B. Willson & Co.
Attorneys

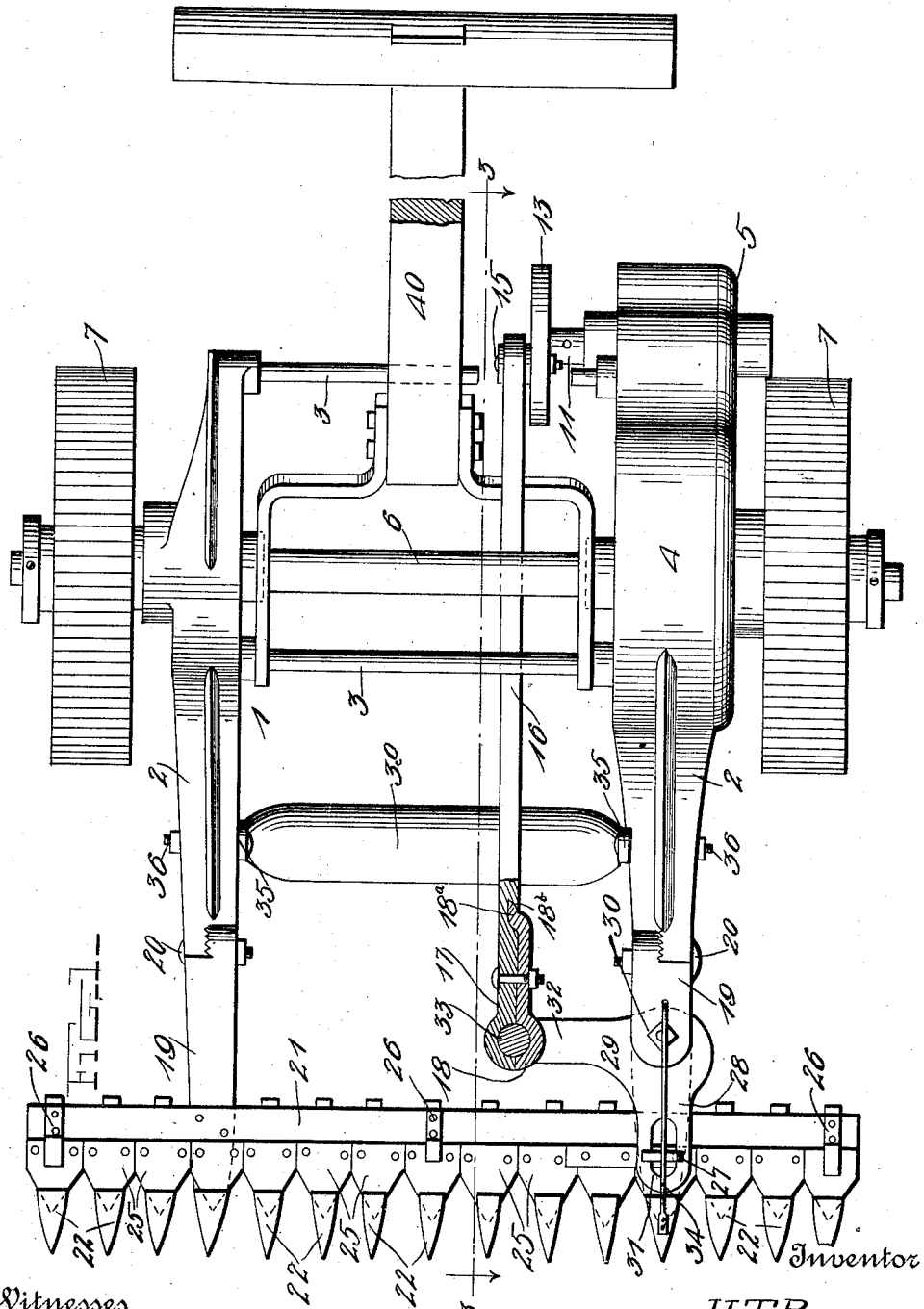

UNITED STATES PATENT OFFICE.

HENRY T. BARNES, OF FLORISANT, MISSOURI.

MOWING-MACHINE.

1,005,125.	Specification of Letters Patent.	Patented Oct. 10, 1911.

Application filed February 16, 1911. Serial No. 608,893.

*To all whom it may concern:*

Be it known that I, HENRY T. BARNES, a citizen of the United States, residing at Florisant, in the county of St. Louis and State of Missouri, have invented certain new and useful Improvements in Mowing-Machines; and I do declare the following to be a full, clear, and exact description of the invention, such as will enable others skilled in the art to which it appertains to make and use the same.

This invention relates to improvements in hand operated mowing machines.

One object of the invention is to provide a mowing machine having an improved construction and arrangement of sickle or cutter bar whereby the grass is cut in advance of the machine and having means whereby the cutting mechanism may be adjusted to cut the grass long or short.

Another object is to provide a mowing machine having means whereby the front end of the machine is adjustably supported.

With the above and other objects in view the invention consists of certain novel features of construction, combination and arrangement of parts as will be more fully described and claimed.

In the accompanying drawings, Figure 1 is a plan view partly in section of a mowing machine constructed in accordance with the invention. Fig. 2 is a side view of the same. Fig. 3 is a vertical longitudinal sectional view on the line 3—3 of Fig. 1. Fig. 4 is a vertical cross sectional view on a line with the axle of the supporting and operating wheels. Fig. 5 is a side view of one side of the machine with the near wheel and side plate of the gear casing removed. Fig. 6 is an inner side view of a portion of one of the supporting wheels.

Referring more particularly to the drawings 1 denotes the main supporting frame for the machine, said frame comprising side members 2 which are connected together by a series of cross bars 3. One of the side members has formed thereon a gear casing 4 in which is arranged the gearing whereby the cutting mechanism is driven as will be hereinafter described. The gear casing is provided with a removable plate or cover 5, whereby the gearing therein is covered and protected.

Revolubly mounted in the side members 2 is a supporting and operating shaft or axle 6 on the outer ends of which are loosely mounted supporting and operating wheels 7. On the inner ends of the hubs of the wheels 7 are formed the outer members 8 of clutches, the inner members 9 of which are engaged with squared portions of the axles. The teeth of the clutch members 8 and 9 are so arranged that when the wheels turn in a forward direction the clutch members will become locked thereby locking the wheels to the shafts and whereby when the wheels are turned backward they will revolve loosely on the axle and the latter thus prevented from driving the operating mechanism in the wrong direction. The clutch members 9 are held in yielding engagement with the members 8 by coiled springs 9ᵃ.

In the gear casing 4 is operatively mounted a train of multiplying gears 10, one of which is fixedly mounted on the adjacent end of the axle 6 in a position as clearly shown in Fig. 4. In the rear end of the gear casing is revolubly mounted a drive shaft 11 on which is fixedly mounted a pinion 12, said pinion being operatively engaged with one of the train of gears 10. The inner end of the shaft 11 projects beyond the inner side of the gear casing and on said projecting end of the shaft is fixedly mounted a crank disk 13 having formed therein a series of passages 14 with one of which is adapted to be engaged a wrist pin 15 to which is pivotally connected one end of a pitman rod 16. The pitman rod projects forwardly and has formed on its forward end the socket member 17 of a ball and socket connection. The socket member 17 comprises a fixed section formed integral with the forward end of the pitman rod and a removable section 18 which is bolted to the end of the rod and has on its inner end a stop lug 18ᵃ adapted to engage a recess 18ᵇ in the side of the rod whereby said section 18 is firmly held in place.

On the outer ends of the side members 2 of the frame is arranged the cutting mechanism of the mower, said mechanism comprising side bars 19 pivotally connected at their inner ends by bolts 20 to the outer ends of the side members 2, said bolts having thereon clamping nuts whereby the bars 19 and the cutting mechanism are supported at the desired elevation. To the outer ends of the side bars 19 is secured a finger bar 21 to which is bolted or otherwise secured a series of guard fingers 22 of which there may be any suitable number.

Slidably engaged with a guide groove 23 in the finger bar 21 is a cutter bar 24 to which are secured a series of cutting blades 25 which may be of the usual or any suitable construction and which are adapted to slidably engage and coact with the fingers 22 in the usual manner. The reciprocating cutter bar is held in sliding engagement with the finger bar by a guide lug 26 as shown. On one end of the reciprocating cutter bar is arranged an upwardly projecting headed stud 27 with which is connected one arm 28 of a bell crank operating lever 29 pivotally mounted on one of the side bars 19, said lever being supported and held in position by an arm or bracket 30 as shown. In the arm 28 is formed a slot 31 whereby said arm is loosely engaged with the headed stud 27 on the cutter bar.

On the other arm 32 of the bell crank lever is arranged the ball member 33 of the ball and socket joint or connection hereinbefore referred to and with which the socket member 17 of the connection is engaged. By thus connecting the pitman rod to the bell crank lever, the movement of the rod will be imparted to the cutter bar to reciprocate the same in the finger bar. By thus connecting these parts the cutting mechanism may be readily raised or lowered without affecting the operating mechanism.

Bolted or otherwise secured at its outer end to the guard finger on the end of the finger bar adjacent to the operating mechanism is a guard and grass deflecting rod 34 which projects upwardly and curves rearwardly over the bell crank lever and its connection with the cutter bar, thus preventing the grass from falling on and interfering with the operation of these parts.

On the inner sides of the side members 2 of the frame, adjacent to the pivotal connection of the cutting mechanism, are longitudinally slotted bearing plates 35, said plates being pivotally and adjustably secured to the side members 2 by clamping bolts 36. In the lower ends of the plates 35 are formed bearing passages 37 with which are pivotally engaged the ends of a supporting roller shaft 38 on which is arranged a supporting roller 39 by means of which the front portion of the machine may be adjustably supported. Pivotally connected to one of the cross bars 3 of the machine is a handle 40 whereby the machine is pushed along and thus operated.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim is:

In combination with a supporting frame of a mowing machine and operating shaft revolubly mounted thereon, of supporting wheels mounted on said shaft and adapted to be separately connected thereto for independent rotation in respect to said shaft, a train of multiplying gears inclosed and protected by a suitable casing carried by the shaft, a cutting mechanism hingedly connected to the forward portion of the frame in advance of the train of multiplying gears, a bell crank lever hingedly secured to the frame and connected to the cutter bar whereby the latter is reciprocated during the travel of the machine, a deflecting rod carried by the cutting mechanism for protecting the bell crank lever, and means for operating the latter.

In testimony whereof I have hereunto set my hand in presence of two subscribing witnesses.

HENRY T. BARNES.

Witnesses:
AUGUST RICKELMANN,
HENRY GOLDFESH.

---

Copies of this patent may be obtained for five cents each, by addressing the "Commissioner of Patents. Washington, D. C."